United States Patent [19]

Chaplin et al.

[11] 4,417,098

[45] Nov. 22, 1983

[54] METHOD OF REDUCING THE ADAPTION TIME IN THE CANCELLATION OF REPETITIVE VIBRATION

[75] Inventors: George B. B. Chaplin, Colchester; Andrew R. Powell, Sheffield; Roderick A. Smith, Colchester, all of England

[73] Assignee: Sound Attenuators Limited, Essex, England

[21] Appl. No.: 253,923

[22] PCT Filed: Aug. 15, 1980

[86] PCT No.: PCT/GB80/00128
§ 371 Date: Apr. 16, 1981
§ 102(e) Date: Apr. 14, 1981

[87] PCT Pub. No.: WO81/00638
PCT Pub. Date: Mar. 5, 1981

[30] Foreign Application Priority Data

Aug. 16, 1979 [GB] United Kingdom ................. 7928570

[51] Int. Cl.³ ............................................ H04B 15/00
[52] U.S. Cl. ...................................... 381/94; 381/95; 381/43
[58] Field of Search .................. 179/1 P, 1 J, 15 D, 179/1 F; 367/901, 135

[56] References Cited

U.S. PATENT DOCUMENTS 3,492,563  1/1970  Myer .
3,818,364  6/1974  Barret .
4,122,303 10/1978  Chaplin et al. .
4,153,815  5/1979  Chaplin et al. ...................... 179/1 P

FOREIGN PATENT DOCUMENTS

2329929  5/1977  France .

Primary Examiner—G. Z. Rubinson
Assistant Examiner—James L. Dwyer
Attorney, Agent, or Firm—Dann, Dorfman, Herrell and Skillman

[57] ABSTRACT

A method of reducing the adaption time needed to adapt a synthetically generated secondary waveform so that it nulls a primary repetitive waveform (e.g. noise) from a source (1) of vibration, the secondary waveform generation (5) being synchronized by the source (1). The clarity and/or the amplitude of at least a part of the signal resulting from interaction between the primary and secondary waveforms is sensed (6) and used (7, 8) to reshape the secondary waveform. The invention finds application in the cancelling of repetitive vibrations (e.g. in quietening the driving cab of a vehicle).

9 Claims, 11 Drawing Figures

METHOD OF REDUCING THE ADAPTION TIME IN THE CANCELLATION OF REPETITIVE VIBRATION

TECHNICAL FIELD

This invention relates to an "active attenuation" method of cancelling noise (or other vibration) in which a primary vibration entering a selected location is nulled or cancelled by means of a secondary vibration which is fed into the location to reduce (and at best eliminate), the influence of the primary vibration. An accurate matching of phase and amplitude of the secondary vibration to the primary vibration is necessary if effective nulling is to result. In particular this invention is concerned with repetitive primary vibrations such as arise, for example, with an internal combustion engine.

BACKGROUND ART

In the specification of U.S. Pat. No. 4,153,815 there is described a method for the reduction of unwanted vibrations received at a selected location from a source of recurring vibrations which method comprised feeding a specially synthesised secondary vibration to said location, the generation of the secondary vibration being triggered by a signal derived from the source, and the waveform of the synthesised secondary vibration being adapted with respect to time to improve the extent to which the secondary vibration nulls the primary vibration at the said location.

DISCLOSURE OF INVENTION

The present invention relates to an adaptive method similar to that described in the preceding paragraph but which is characterised in that the time taken to evolve a successful adaption of the secondary vibration is reduced by monitoring the contemporary residual vibration at the said location which results from interaction between the primary vibration and the contemporary secondary vibration, and effecting the adaption of the secondary vibration on the basis of the amplitude and/or the polarity of at least a part of the contemporary residual vibration.

Suitably the amplitude and/or the polarity of each pulse of the residual vibration is cyclically sensed in a plurality of successive time intervals, each separate sensing being separately used in the correct sequence to control the adaption of a different part of the secondary vibration.

BRIEF DESCRIPTION OF THE DRAWINGS

The invention will now be further described, by way of example, with reference to the accompanying drawings, in which.

DESCRIPTION OF PREFERRED EMBODIMENTS

In the following description reference will be made to the cancellation of noise (i.e. acoustic vibrations in air) but it should be understood that the invention is equally applicable to the cancellation of vibration in gases, liquids or solids.

Figure 1:
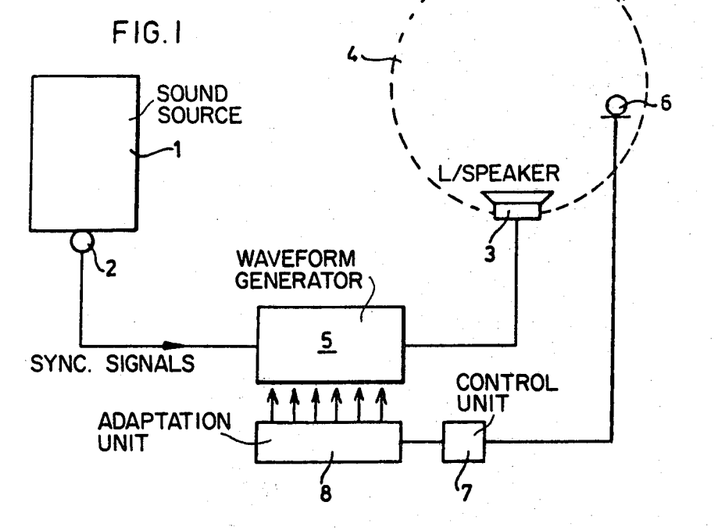
FIG. 1 is a schematic illustration of the broad principles behind the method of the invention.

FIG. 1 shows a source 1 of a recurring noise which is nulled in a protected area 4 by a secondary vibration generated by a transducer (e.g. a loudspeaker) 3. A waveform generator 5 powers the transducer 3 and the output of this generator 5 is synchronised with the noise generation by a transducer 2 on the source 1. A microphone 6 in the area 4 senses the residula sound and feeds this to a control unit 7 which controls an adaptation unit 8 used to modify the output waveform of the generator 5 and thus seek for total cancellation in the area 4.

Figure 2:
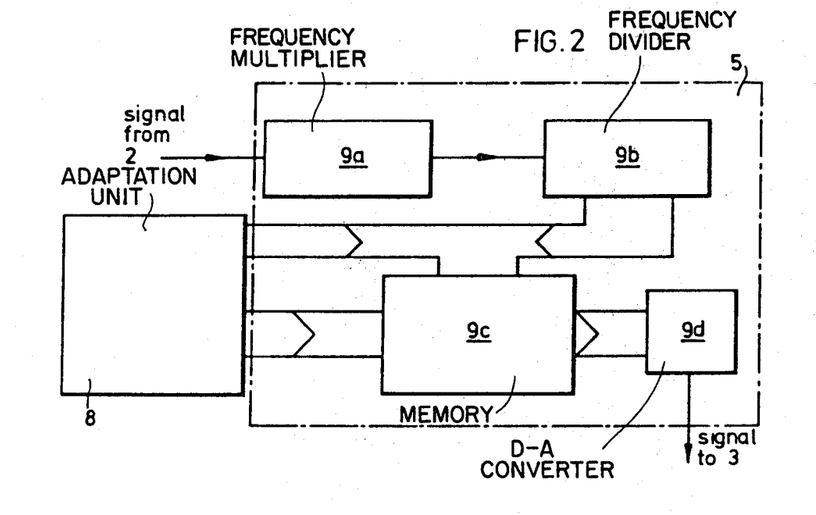
FIG. 2 is a block diagram illustrating one embodiment of waveform generator as shown in FIG. 1.

One form of generator 5 and adaptation unit 8 which can be used in the system of FIG. 1 is illustrated in FIG. 2.

The synchronisation signal(s) from the transducer 2 will be at a repetitive frequency f. If only one synchronising pulse per cycle is available, this will be fed to a frequency multiplier 9a (e.g. incorporating a phase locked loop) which feeds a frequency which is an integer multiple of the frequency f to a frequency divider chain 9b which sequentially addresses locations of the memory 9c. Preferably the synchronisation signal is derived from a toothed wheel or the like driven by the engine, and in this way a train of perhaps a hundred equally spaced pulses will be generated in each cycle of the source so that the integer 9a would not then be required.

The waveform memory 9c stores a plurality of samples each having a unique address in the memory 9c. The samples represent portions of a precursor of the required waveform to be generated and are presented sequentially to a digital-to-analog converter 9d (which includes a power amplifier and a low pass filter to remove sampling frequencies) to generate the actual waveform to be fed to the transducer 3. It is because each of the samples must be presented once per repetition of the acoustic waveform to generate the required secondary wave that the need arises for a frequency multiplier if only a single synchronising pulse is available from the source. The degree of multiplication depends on the number of samples required and in a typical case this could be 32. The samples stored in the memory 9c can be derived in a variety of different ways but since the memory is modified by the unit 8 to minimise the output from the unit 7, it is not generally too important what the starting samples are, since eventually if each burst of recurring primary sound energy is like each other burst, the correct samples will appear in the memory 9c and the pattern of samples one starts with merely affects how long it takes to produce the correct cancelling signal.

Although the foregoing description referred to 32 discrete elements, there could of course be a larger or a smaller number. Alternatively, one can interpolate between time elements in such a way as to simulate the effect of a much larger number of elements than are actually present. This interpolation can be performed either in the residual signals line, in order to provide the information for adjusting the appropriate cancelling elements, or can be performed between elements of the cancelling waveform.

Referring again to FIG. 1, the control unit 7 serves to process the residual signal picked up by the residual noise microphone 6, this signal being the sum of the sound from the recurring sound source 1 and the cancelling sound being generated by the transducer 3. In the system described in U.S. Pat. No. 4,153,815, this signal is processed by the control unit 7 to give an output related to the overall power of the residual signal. The cancelling waveform is adjusted so as to reduce this overall power level.

The present invention involves deriving information from at least one part of the residual signal to reduce the adaption time. For example parts of the residual waveform may be masked such that the residual power signal includes only those parts of the residual which are considerably affected by a modification to the cancellation waveform.

A further embodiment involves sampling the residual signal at an appropriate point after an alteration to the cancelling waveform and using the polarity and/or magnitude of the change in residual signal as a correcting parameter to the corresponding element of the next cycle of the cancelling waveform. Such an operation can be performed on a single time element or on a plurality of time elements per repeat cycle of the waveform.

However, a more effective system would be to perform the operation the other way round i.e. to observe the residual signal and make changes to the subsequent cycle cancellation waveform based on information from the previous residual waveform. Again a single modification or a plurality of modifications could be performed during each repeat cycle.

A particular element of the residual noise signal can be related to casue in the cancellation signal at integer 3 at an earlier time. There may be a single significant causing element or a series of significant causing elements at various earlier times. It is necessary therefore to compensate for the delay or delays between the causing element(s) and the residual effect. The compensation is applied after sensing the residual signal and prior to applying a correction to the next cyclic cancellation signal. Instead of applying a controlled modification exactly one repeat cycle later, it is applied at a time period ($\Delta t$) less than one repeat cycle later such that the difference $\Delta t$ compensates for the acoustic delay.

This delay could be manually adjusted but in practice it may vary. For example, in the case of cancellation in a cab, the opening or closing of a cab window would affect the delay. It will therefore probably be advantageous to automate the delay by, for example, relating it to the impulse response of the system, or by sensing one or more maxima in the cross-correlation function between the cancelling waveform and the residual waveform.

It will be seen therefore that in order to reduce the time taken for the waveform generator 5 to build up the cancellation signal, it is necessary to retain more information about the nature of the residual noise signal. In one simple arrangement it is possible to obtain information about the polarity of the residual noise signal at a given point during a noise cycle, and thus use this information to ensure that at the same point in the noise cycle the incremental modification to the cancellation waveform has the opposite polarity and will hence improve cancellation at least at the said point.

A more sophisticated system allows not only the polarity but also the magnitude of the residual noise signal to be measured at a particular instant in time. This information can then be used directly to rapidly build up the cancellation signal and reduce the adaption time for substantially complete nulling to occur.

In algebraic terms, the precursor of the cancelling noise is stored as a series of samples in a memory and may be represented as an ensemble of samples $[y_n]$, where n is the number of samples for one cycle of the waveform. The residual noise signal e(t) picked up by the microphone 6, may be sampled and also represented as an ensemble $[e_n]$ having the same number of samples as $[y_n]$. It is possible to relate a change in any sample of $[y_n]$ to a corresponding change in the sampled error signal $[e_n]$, thus enabling information conveyed by $[e_n$9 to adjust $[y_n]$.

Figure 3:
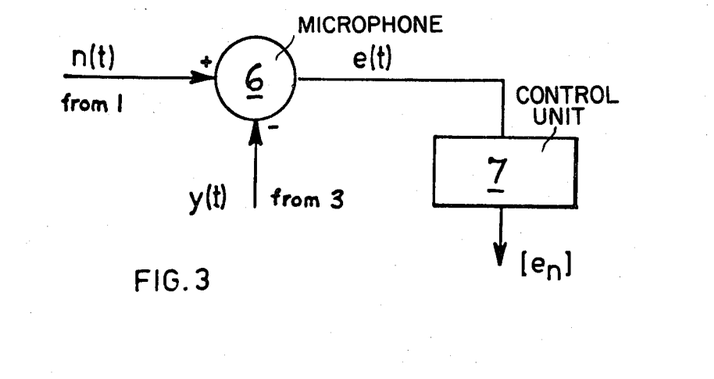
FIG. 3 is a schematic indication of the principle for the fast adaption achieved by the method of the invention.

FIG. 3 shows how the microphone 6 generates an error signal e(t) from the sum of the original noise n(t) from the source 1 and the cancellation noise y(t) from the source 3 and how this is converted into an ensemble $[e_n]$ in the device 7. The device 7 could be a sample-and-hold circuit or an analog-to-digital converter, its purpose being to determine a parameter of e(t) at a repeatable position on the repetitive waveform.

Figure 4:
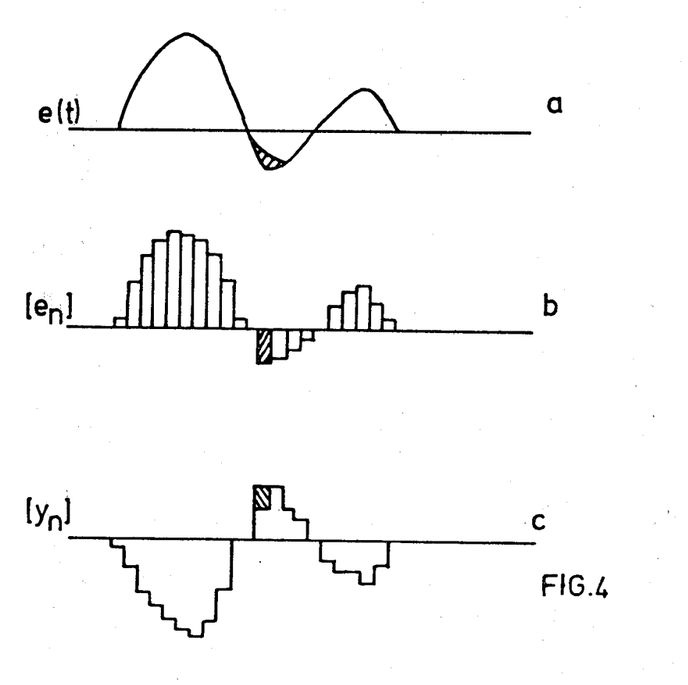
FIG. 4 shows three graphs of actual and simulated waveforms.

The upper graph a in FIG. 4 shows a waveform representing a single cycle of the error signal e(t). This waveform is also shown in sampled form $[e_n]$ in the middle graph b of FIG. 4. The lower graph c of FIG. 4 shows the cancellation waveform $[y_n]$. If the $j^{th}$ element of $[y_n]$ is adjusted by an amount depicted by the hatched area in graph c it will have an effect on the error signal e(t) and its sampled form $[e_n]$, also as shown by the hatched areas in graphs a and b. Conversely it is therefore possible to determine what adjustment must be made to the $j^{th}$ element of $[y_n]$ in order to reduce the size of the $j^{th}$ element of $[e_n]$.

The analysis so far has ignored the effect arising because there will be a time delay between changing the value of the $j^{th}$ element of $[y_j]$ and seeing its effect on $[e_j]$. This time delay is, among other things, due to the acoustic delay between the microphone 6 and the source 1. Since in many cases this delay will remain substantially constant at any particular firing rate, it will correspond approximately to a constant number of waveform samples, and it is a simple matter to arrange that it is the $(j+k)^{th}$, element of the error signal that is reviewed when seeking to adjust the $j^{th}$ element of the cancelling waveform, "k" being the number of elements by which the signal has been delayed.

Figure 5:
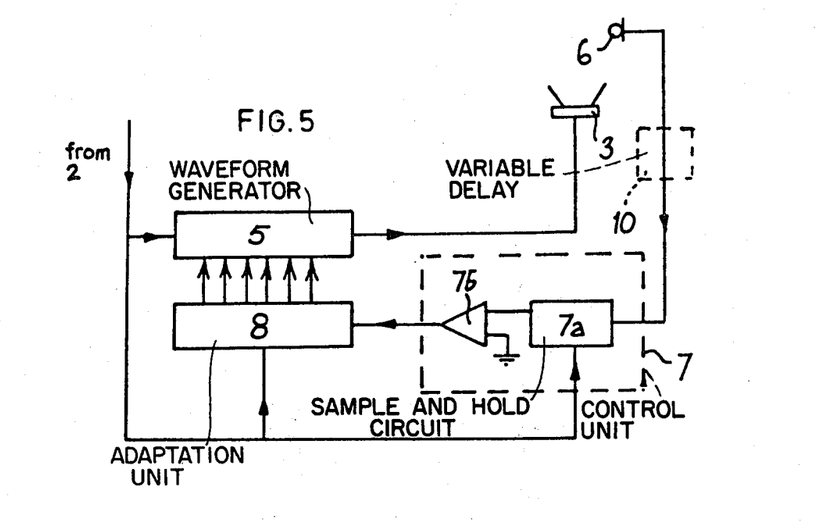
FIG. 5 is a schematic illustration of a first embodiment of apparatus for carrying out the method of the invention.

Since this process may be executed rapidly enough, it becomes possible to adjust all n samples of $[y_n]$ for each cycle of the noise, thus obtaining a marked increase in speed of adaption. FIG. 5 shows how one such type of control function may be realised for a practical system.

The control unit 7 within the dashed line box, here comprises a sample/hold circuit 7a, and a comparator, 7b. The error signal from the microphone 6 is fed to the sample and hold circuit 7a, which is synchronised by the timing signals received from the transducer 2 which is also controlling the initiation of each cancelling waveform pulse generated by the generator 5. Thus the eror signal e(t) will be sampled in synchronism with the cancelling signal. The sampled error signal [$e_n$] is then compared with the desired error signal, which will normally be chosen as zero, resulting in a binary level signal representing the polarity of the sampled error signal at each element n. This control function called G(e) may be represented as $$G(e)_n = \text{sgn } e_n$$

This may be used in the following algorithm to adjust the values of the cancelling waveform [$y_n$] (assuming zero acoustic delay)

$$y_j^k = y_j^{k-1} - \Delta \text{sgn } e_j^{k-1}$$

where j represents the $j^{th}$ element of [$y_n$] and k is the $k^{th}$ iteration of the process $\Delta$ represents the increment by which each sample of the waveform is adjusted. $\Delta$ may have a single value or may take on different values at different times to enable coarse and fine adjustment of [$y_n$]. The value of $\Delta$ may be changed either as a function of time or of amplitude of the residual noise, depending on the adaption requirements for a particular application.

The circuit 7a can be dispensed with and the error signal fed directly to the comparator provided the unit 8 can accept data from the comparator at the correct times.

To obtain more rapid adaption, even more information about the error signal may be retained. For example, a scheme, illustrated in FIG. 7, may be employed, in which information about the amplitude of the error signal is employed in the adaption.

Figure 7:
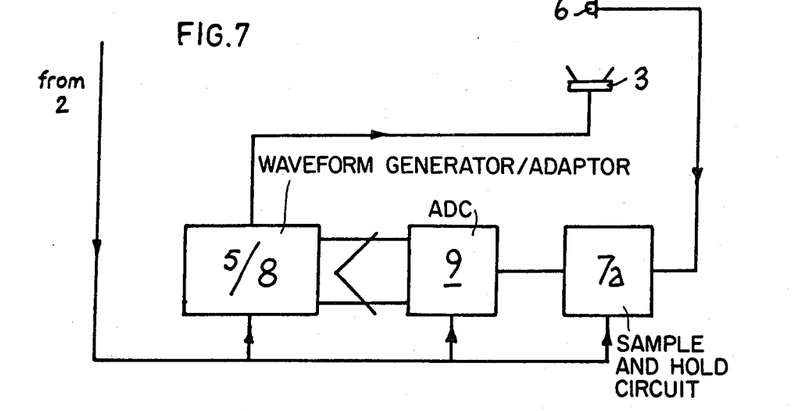
FIG. 7 and 8 are schematic illustrations of second and third embodiments of apparatus for carrying out the method of the invention.

In FIG. 7, the error signal from the microphone 6 is fed to a sample-and-hold circuit 7a (which may be dispensed with) and then to an analog to digital convertor 9 which modifies a combined waveform generator and adaptation unit 8 in the correct sequence controlled by the train of synchronising signals derived from the transducer 2.

In the embodiment of FIG. 7 use is made of a linear control function $$G(e)_n = \alpha e_n$$

in which a proportion $\alpha$ of the error signal is fed back to the waveform adaptor 8.

The algorithm used to adjust the values of [$y_n$] in this case is (assuming zero acoustic delay)

$$y_j^k = y_j^{k-1} - \alpha e_j^{k-1}$$

Thus each value of [$y_n$] is updated by an amount proportional to the error between the noise source and cancelling source. This system produces rapid convergence provided $\alpha$ is less than unity.

The invention will now be further described with reference to FIG. 5 to 10 by the following Example.

EXAMPLE

A 1HP single cylinder petrol engine 20 was used as a noise source creating a repetitive noise at an exhaust outlet 21. The noise was picked up at microphone 26 placed approximately one meter from the outlet 21 and was fed to a control circuit generally designated 27.

Here the waveform information is processed before being fed to a microprocessor generally designated 30. The microprocessor 30 generates and adjusts a cancelling waveform which is fed to a loudspeaker 23, the waveform being synchronised to the speed of the engine by a train of signals received from a transducer 22.

The cancelling waveform generated by the microprocessor 30 consists of a number of samples (between 32 and 256) whose values are stored in successive locations in a digital memory 30b. These are read out to a digital-to-analog converter 30c at intervals dictated by the train of signals from the transducer 22, so that the cancelling signal will be in strict synchronism with the firing strokes of the engine 20.

The residual noise signal from the microphone 26 is sampled into the same number of samples as the number of samples being generated for the cancelling signal by a sample-and-hold circuit 27a. This sampled signal can then be fed either to a comparator (e.g. such as 7b in FIG. 5) to give a sensing of the polarity of each sample of ther residual noise signal with respect to zero or to an analog-to-digital converter (e.g. such as 9 in FIG. 7).

Dealing first with the polarity-sensing adaptive system, if each element of this error signal is made to correspond with a particular sample value of the cancelling waveform, then that sample value may be adjusted in the manner described by the following equation:

$$y_j^k = y_j^{k-1} - \Delta \text{sgn } e_j^{k-1}$$

where
j is the $j^{th}$ element of the waveform
k is the $k^{th}$ iteration
$\Delta$ is the increment by which the element is to be adjusted $$\text{sgn } e_j^{k-1}$$

represents the sign of the $j^{th}$ element of the sampled error signal.

In other words, if the error signal is positive at a particular point j on the waveform, then the cancelling waveform at that point is reduced by an amount $\Delta$ making it more negative and hence reducing the positive pressure of the noise waveform. If the error signal is negative then the corresponding sample of the cancelling waveform is incremented by $\Delta$. $\Delta$ represents an arbitrary increment by which each element is adjusted. Its value may be fixed or can be altered to facilitate coarse and fine adjustment of the waveform.

Figure 6:
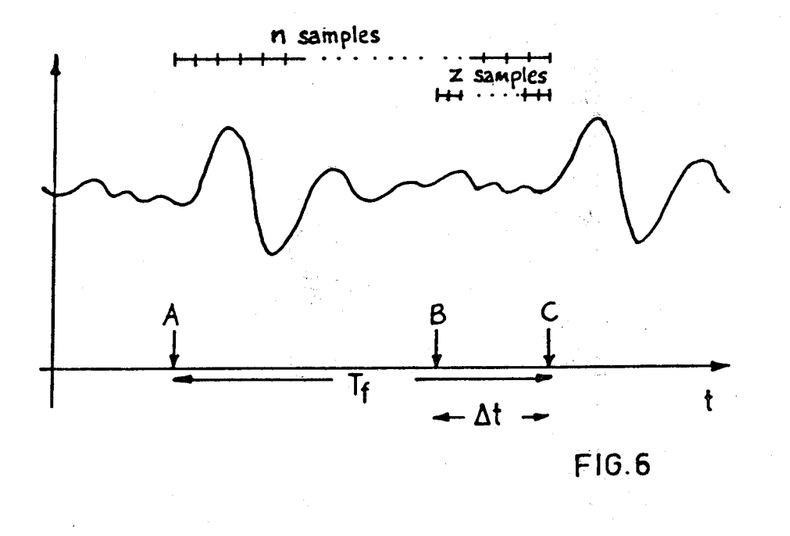
FIG. 6 is a graph illustrating how delay is compensated for in the method of the invention.

In pratice the $j^{th}$ element of the error signal does not correspond to the $j^{th}$ element of the cancelling waveform, since for a practical system there is a delay of several milliseconds between the time the signal is fed to the speaker and the time it is received at the microphone. This delay (see FIG. 6) can be accommodated by substrating a time offset from the point in the waveform which is controlled by the error signal at j, i.e.

$$y_{(j-z)}^k = y_{(j-z)}^{k-1} - \Delta \text{ sgn } e_j^{k-1}$$

The magnitude of this offset, the time between B and C in FIG. 6, is shown in FIG. 6 expressed in z samples of the waveform. The time delay between the application of a signal from the cancelling waveform generator and its maximum offset at the residual microphone must correspond to z samples, e.i.

$$\Delta t = z \times T_s$$

where
$\Delta t$ = delay, sensibly constant for a given speaker-microphone arrangement
$z$ = offset number of samples
$T_s$ = sampling period = $(T_f/N)$ and
$T_f$ = periodicity of the noise i.e.

$$z = \frac{\Delta t}{T_s}$$

This offset number can be updated from time to time under programme control for example by measuring $T_s$, thus compensating for changing repeat cycle rates and changing periods for each of the samples.

Figure 9:
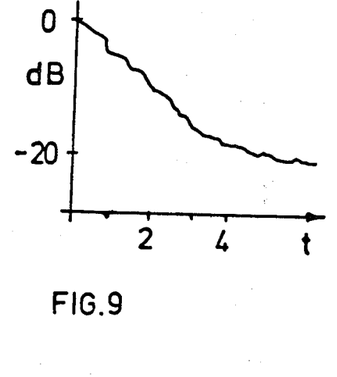
FIGS. 9 and 10 are graphs illustrating the performance obtainable with the method of the invention.

Using this technique each waveform element is adjusted by an amount $\Delta$ during each cycle of the noise, hence the adaption time is very much faster. FIG. 9 shows a plot of sound pressure level as ordinate against time as abscissa. Initially the cancellation signal is zero and there is no attenuation. After about 4 seconds, the sound pressure level has been reduced by 20 dB.

Figure 8:
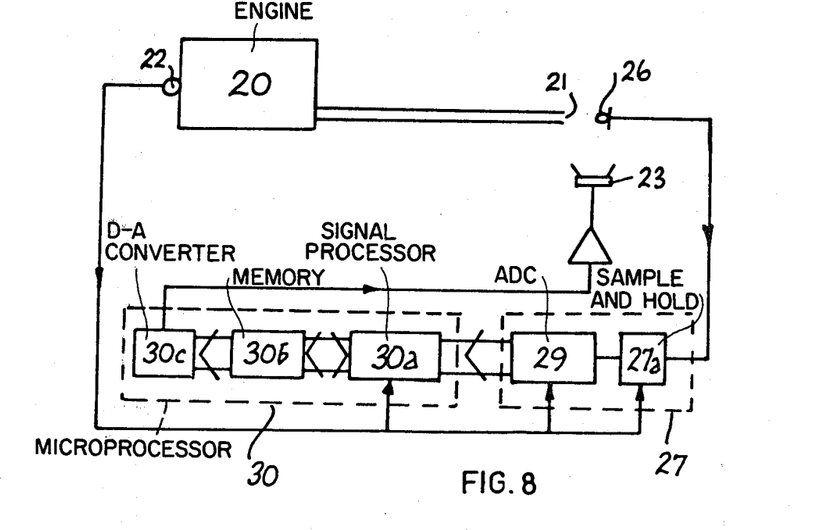

Adaption time can be improved still further by using the control system described with reference to FIG. 7. This is the arrangement shown in FIG. 8. The error signal from the microphone 26 is sampled by the sample-and-hold circuit 27a in the same manner as described earlier. The sampled signal is then fed to an analog-to-digital convertor 29 which converts each sample value into an eight-bit digital representation. The waveform is generated in the manner previously described but now the sample values are adjusted by substracting the digital representation of the error signal from the previously stored cancellation waveform sample values in a memory processing unit 30a. This can be described mathematically as $$y_j^k = y_j^{k-1} - \alpha e_j^{k-1}$$

where $\alpha$ is a gain factor and $e_j$ is the digital representation of the $j^{th}$ element of the error signal.

Additionally the error signal from the microphone 26 may be weighted prior to the subtraction process in order to compensate for the characteristics of the loudspeaker 23 and/or the acoustic conditions. This compensation may be performed by a filter whose characteristics may be calculated or measured for a given system. The filter may also be of an adaptive variety whose parameters are adjusted prior to or during the vibration cancellation process.

Figure 10:
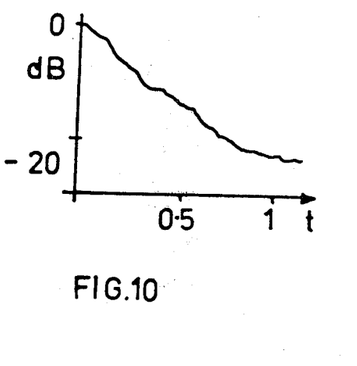

FIG. 10 shows a graph of sound pressure level plotted as ordinate against time plotted as abscissa. It can be seen that the time taken for 20 dB attenuation to be achieved is less than one second. Because this time is so short it becomes possible for the cancellation system to track the wave shape of a recurrent noise source whose speed or load is constantly changing whilst still maintaining cancellation.

Figure 11:
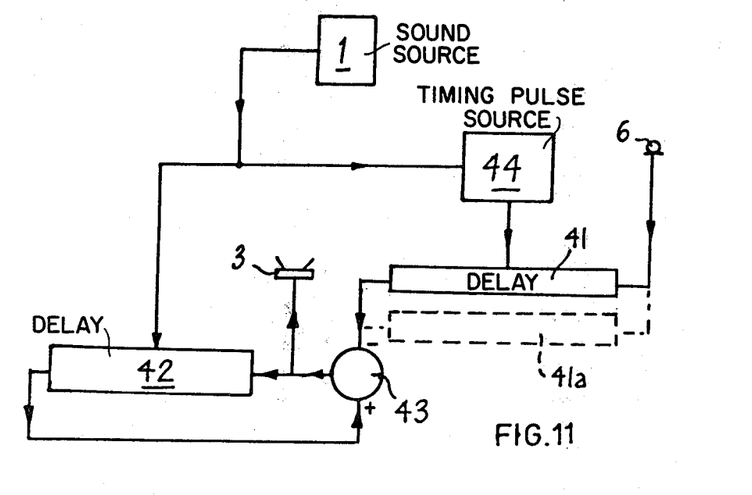
FIG. 11 is a schematic illustration of a fourth embodiment of apparatus for carrying out the method of the invention.

An alternative implementation of this system is illustrated in FIG. 11 which shows two signal delay paths which may be partially digital (e.g. programmed on a micrprocessor) or analog (e.g. implemented in charge coupled device technology).

The first delay, integer 41 of FIG. 11, provides the delay between arrows A and B of FIG. 6. The period of this dely is $T_f - \Delta t$ which can be arranged by a suitable circuit 44, synchronised to the repetition rate of a vibration source 1, in systems which must tolerate rapid changes in repetition rate. Integer 44 provides timing pulses for the delay unit 41 of such a frequency that the delay is $T_f - \Delta t$, where $T_f$ is the slowly varying repetition rate of the waveform and $\Delta t$ is constant. For systems operation at constant repetition rate but with rapid waveshape changes, integer 41 may provide a simple delay function.

The second delay, integer 42, stores and cyclically presents repetitive cancelling wave, summed (in an integer 43) with the controlling error signal from the integer 41. The timing for the integer 42 may be synchronised by the source 1 by, for example, a tone wheel on rotating machinery producing the repetitive noise.

In a practical system (e.g. when using a secondary vibration to quieten the driving cab of a vehicle) it may be necessary to provide means to trim the delay during use (e.g. to compensate for a cab window being opened) and such trimming of the delay can be effected in a number of different ways.

Further it may be necessary to use a plurality of delays 41 in parallel (e.g. as shown dotted at 41a in FIG. 11) where the response of the microphone 6 to a delta function fed as the input to the transducer 3 gives more than one significant peak.

It may also be necessary to trim the delay slightly to ensure it is accurately represented by an integral number of time periods z (see FIG. 6) and this can be done with a variable delay (such as 10 in FIG. 5).

FIG. 6 indicates how the delay can be accommodated. The waveform shown in the upper part of FIG. 6 will be seen to repeat after the period $T_f$ (i.e. from arrow A to arrow C represents one cycle of the repetitive waveform). This period is divided into n equal samples (as discussed with reference to FIG. 4). As the repetition rate of the source changes (e.g. $T_f$ is reduced) each interval n will become shorter but there will still be n samples in the changed period $T_f$. The acoustic delay (unaffected by changing the repetition rate) will now occupy more samples (z) of the waveform, so that the electronic compensating delay A-B must be reduced.

We claim:
1. A method of reducing the amplitude of primary vibration pulses received at a selected location from a source of recurring primary vibration, which method comprises feeding specially synthesised pulses of secondary vibration to said location, the generation of the said pulses of secondary vibration being triggered by a signal derived from the source, and the waveform of the said synthesised pulses of secondary vibration being adapted with respect to the time to improve the extent to which the secondary vibration nulls the primary vibration at the said location, characterised in that the time taken to evolve a successful adaption of the pulses of secondary vibration is reduced by monitoring the pulses of residual vibration at the said location which result from interaction between each primary vibration pulse and the respective pulse of secondary vibration, and effecting the adaption of the waveform of the pulses of secondary vibration on the basis of the amplitude and/or the polarity of a pulse of the residual vibration cyclically sensed in a plurality of successive time intervals, each separate sensing being used in the derived sequence to control the adaption of a different part of the waveform of a subsequent pulse of the secondary vibration.

2. A method as claimed in claim 1, characterised in that the polarity of the residual vibration is determined in a given time interval and the magnitude of the waveform of a pulse of the synthesised secondary vibration in a corresponding time interval is increased by a given increment if the sensed polarity is in one direction and is reduced by the same increment if the sensed polarity is in the other direction.

3. A method as claimed in claim 2, characterised in that the magnitude of the said given increment is reduced as the adaption proceeds towards a perfect nulling operation.

4. A method as claimed in claim 1, characterised in that the amplitude of a pulse of the residual vibration is sensed in a given time interval and the magnitude of the waveform of the pulses of synthesised secondary vibration in corresponding time intervals are adjusted by a proportion of a signal representing the sensed amplitude.

5. A method as claim 1, characterised in that a microphone in the said location is used to sense the pulses of residual vibration, the output from the microphone being fed to a comparator, the output of which indicates at any instant in the output waveform of the microphone whether that output is positive or negative with respect to a reference potential, the output of the compartor being fed to an adaptation unit of a waveform generator producing, via a transducer, the pulses of secondary vibration.

6. A method as claimed in claim 1, characterised in that a microphone in the said location is used to sense the pulses of residual vibration, the output from the microphone being fed to an analog-to-digital convertor, the output of which is fed to a microprocessor including a central processing unit, a memory and a digital-to-analog convertor, the digital-to-analog convertor feeding a transducer serving as source of the pulses of secondary vibration fed to the said location.

7. A methodas claimed in claim 1, characterised in that the triggering signal received from the source during each recurring pulse of the primary vibration comprises a chain of triggering signals, this chain of triggering signals being used to define a plurality of successive time intervals in each pulse of the synthesised secondary vibration and to synchronise the adaption of pulses of secondary vibration by at least one selected part of the pulses of residual vibration.

8. A method as claimed in claim 7, characterised in that means is provided to alter the number of time intervals in the chain by which the adaptive action is delated relative to the chain of time intervals in the subsequent pulse of secondary vibration.

9. A method as claimed in claim 8, characterised in that there is more than one delay and means is provided to automatically modify the time interval of each delay.

* * * * *

UNITED STATES PATENT AND TRADEMARK OFFICE
CERTIFICATE OF CORRECTION

PATENT NO. : 4,417,098
DATED : November 22, 1983
INVENTOR(S) : George B. B. Chaplin et al It is certified that error appears in the above-identified patent and that said Letters Patent is hereby corrected as shown below:

Column 2, line 25, "residula" should read --residual--.
Column 3, line 25, after "residual" insert --waveform--.
Column 4, line 24, "$[e_n 9$" should read --$[e_n]$--.
Column 6, line 21, "ther" should read --the--;
line 52, "pratice" should read --practice--;
line 58, "subtrating" should read --subtracting--;
line 68, "e.i." should read --i.e.--.
Column 7, line 35, "subtrating" should read --subtracting--;
line 68, "dely" should read --delay--.
Column 8, line 31, after "10" insert --shown--.
Claim 5, Column 9, line 22, delete "as claim 1" and insert --as claimed in claim 1--.
Claim 8, Column 10, line 23, "delated" should read --delayed--.

Signed and Sealed this

Third Day of April 1984

[SEAL]

Attest:

Attesting Officer

GERALD J. MOSSINGHOFF

Commissioner of Patents and Trademarks